US009308975B2

(12) United States Patent
Vander Lind

(10) Patent No.: US 9,308,975 B2
(45) Date of Patent: Apr. 12, 2016

(54) SPAR BUOY PLATFORM

(71) Applicant: Google Inc., Mountain View, CA (US)

(72) Inventor: Damon Vander Lind, Alameda, CA (US)

(73) Assignee: Google Inc., Mountain View, CA (US)

( * ) Notice: Subject to any disclaimer, the term of this patent is extended or adjusted under 35 U.S.C. 154(b) by 139 days.

(21) Appl. No.: 14/144,272

(22) Filed: Dec. 30, 2013

(65) Prior Publication Data
US 2015/0183516 A1 Jul. 2, 2015

(51) Int. Cl.
*A63H 27/08* (2006.01)
*B63B 35/44* (2006.01)
*F03D 1/00* (2006.01)
*B63B 21/50* (2006.01)
*B63B 43/06* (2006.01)
*F03D 5/00* (2006.01)

(52) U.S. Cl.
CPC ................. *B63B 35/44* (2013.01); *B63B 21/50* (2013.01); *B63B 43/06* (2013.01); *F03D 1/00* (2013.01); *F03D 5/00* (2013.01); *B63B 2035/442* (2013.01); *B63B 2035/446* (2013.01); *F05B 2240/917* (2013.01); *F05B 2240/921* (2013.01); *F05B 2240/95* (2013.01)

(58) Field of Classification Search
CPC ............... B64F 1/12; B64F 1/14; B64F 3/00; B64F 3/02; B64C 39/022; B63B 34/44; F03D 9/003; F03D 9/005; F03D 11/04
USPC .................................... 244/154, 155 A, 155 R
See application file for complete search history.

(56) References Cited

U.S. PATENT DOCUMENTS

| 7,504,741 | B2 | 3/2009 | Wrage et al. |
| 7,672,761 | B2 | 3/2010 | Wrage et al. |
| 7,830,033 | B2 | 11/2010 | Meller |
| 7,971,545 | B2 | 7/2011 | Wrage |
| 8,056,490 | B2 | 11/2011 | Wrage |
| 8,247,912 | B2 | 8/2012 | Da Costa Duarte Pardal et al. |
| 9,003,631 | B2 * | 4/2015 | Yamamoto et al. ........ 29/525.01 |
| 2002/0192068 | A1 | 12/2002 | Selsam |
| 2006/0269396 | A1 * | 11/2006 | Borgen ................... F03D 11/04 415/84 |
| 2007/0040388 | A1 * | 2/2007 | Nielsen .......................... 290/55 |
| 2010/0133385 | A1 * | 6/2010 | Olson ........................ 244/155 A |

(Continued)

FOREIGN PATENT DOCUMENTS

EP   0 045 202   2/1982
JP   11-281758   10/1999

(Continued)

OTHER PUBLICATIONS

Makani Power, "How does it work?" http://makanipower.com/how-does-it-work, accessed Nov. 1, 2013, 3 pages.

(Continued)

*Primary Examiner* — Christopher P Ellis
*Assistant Examiner* — Richard G Davis
(74) *Attorney, Agent, or Firm* — McDonnell Boehnen Hulbert & Berghoff LLP.

(57) ABSTRACT

An offshore airborne wind turbine system including an aerial vehicle, an electrically conductive tether having a first end secured to the aerial vehicle and a second end secured to a platform, a rotatable drum positioned on the platform, an aerial vehicle perch extending from the platform, wherein the platform is positioned on a top of a spar buoy.

17 Claims, 11 Drawing Sheets

(56) References Cited

U.S. PATENT DOCUMENTS

| | | | |
|---|---|---|---|
| 2010/0295303 A1 | 11/2010 | Lind et al. | |
| 2011/0260462 A1* | 10/2011 | Vander Lind | 290/55 |
| 2011/0266809 A1 | 11/2011 | Calverley | |
| 2012/0104763 A1 | 5/2012 | Lind | |
| 2013/0221154 A1 | 8/2013 | Vander Lind et al. | |
| 2013/0221679 A1 | 8/2013 | Vander Lind | |

FOREIGN PATENT DOCUMENTS

| | | |
|---|---|---|
| WO | 2010/033068 | 3/2010 |
| WO | 2010/143214 | 12/2010 |

OTHER PUBLICATIONS

Makani Power, "What is Airborne Wind Power?" http://makanipower.com/what-is-airborne-wind, accessed Nov. 1, 2013, 2 pages.

SkySails GmbH—Power, Screen shot of Skysails, http://www.skysails.info/english/power, accessed Jan. 29, 2014, 2 pages.

International Searching Authority, International Search Report and Written Opinion for PCT/US2014/070937 mailed Mar. 24, 2015, 16 pages.

\* cited by examiner

SPAR BUOY PLATFORM

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

The use of wind turbines as a means for harnessing energy has been used for a number of years. Conventional wind turbines typically include large turbine blades positioned atop a tower. The cost of manufacturing, erecting, maintaining, and servicing such wind turbine towers, and wind turbines is significant.

An alternative to the costly wind turbine towers that may be used to harness wind energy is to use an aerial vehicle attached to a ground station with an electrically conductive tether. Such an alternative may be referred to as an Airborne Wind Turbine or AWT.

SUMMARY

An offshore airborne wind turbine system now provides a viable way to harness wind energy in deep offshore applications that were previously unavailable. An airborne wind turbine system is positioned on top of a spar buoy that is moored to the seabed. The airborne wind turbine system includes an aerial wing connected to an electrically conductive tether that transfers electricity generated by the aerial wing to a platform on the spar buoy, where it is transferred to shore via cabling, and onto the grid in some cases. The power may also be used locally, e.g., to reform aluminum or compress air into a compressed air tank on the bottom of the ocean. This airborne wind turbine system does not require large towers attached to the seabed and is therefore suitable for use in deep offshore locations as it utilizes a floating buoy that may be simply moored to the ocean floor with mooring lines.

In another aspect, an offshore airborne wind turbine system is provided including an aerial vehicle, an electrically conductive tether having a first end secured to the aerial vehicle and a second end secured to a platform, a rotatable drum positioned on the platform, an aerial vehicle perch extending from the platform, wherein the platform is positioned on a top of a spar buoy.

In another aspect, a spar buoy is provided including a vertically oriented main member, wherein the main member is configured to support an airborne wind turbine system platform positioned on an upper end of the main member, a ballast at a lower end of the main member, wherein a second end of an electrically conductive tether is attachable to the platform, and wherein an aerial vehicle is attachable to a first end of the tether.

These as well as other aspects, advantages, and alternatives, will become apparent to those of ordinary skill in the art by reading the following detailed description, with reference where appropriate to the accompanying drawings.

DETAILED DESCRIPTION

Figure 1:
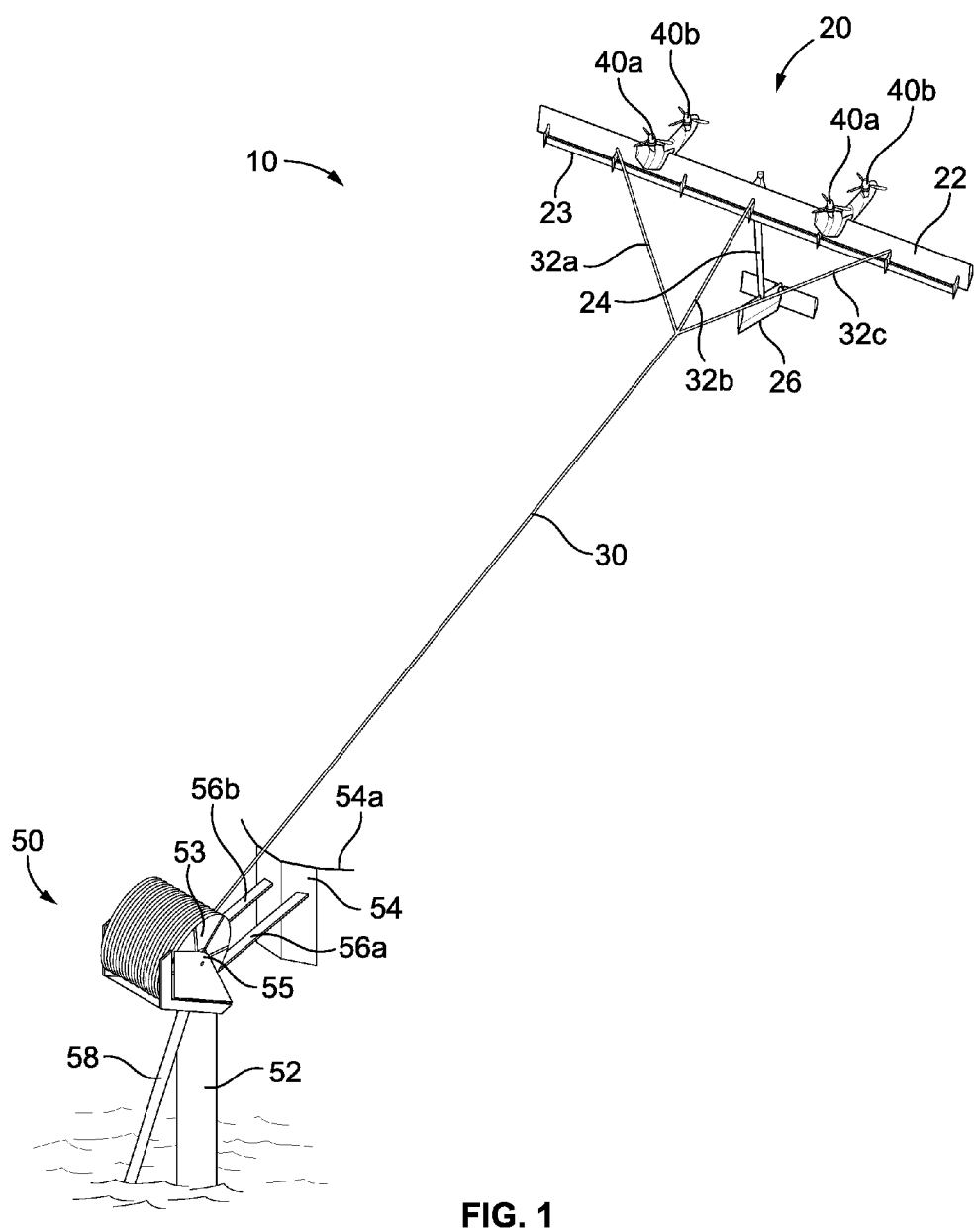
FIG. 1 is a perspective view of an offshore airborne wind turbine 10 including aerial vehicle 20 attached to a spar buoy platform with an electrically conductive tether 30, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. OVERVIEW

Example embodiments relate to aerial vehicles, which may be used in a wind energy system, such as an Airborne Wind Turbine or AWT. In particular, illustrative embodiments may relate to or take the form of methods and systems using an airborne vehicle that is attached to a ground station using an electrically conductive tether.

Wind energy systems, such as an AWT, may be used to convert wind energy to electrical energy. An AWT is a wind based energy generation device that may include an aerial vehicle constructed of a rigid wing with mounted turbines. The aerial vehicle may be operable to fly in a path across the wind, such as a substantially circular path above the ground (or water) to convert kinetic wind energy to electrical energy. In such cross wind flight, the aerial vehicle flies across the wind in a circular pattern similar to the tip of a wind turbine. The rotors attached to the rigid wing may be used to generate power by slowing the wing down. In particular, air moving across the turbine blades may force the blades to rotate, driving a generator to produce electricity. The aerial vehicle may also be connected to a ground station via an electrically conductive tether that transmits power generated by the aerial vehicle to the ground station, and on to the grid in some cases, or used locally.

When it is desired to land the aerial vehicle, the electrically conductive tether may be wound onto a spool or drum in the ground station, which reels in the aerial vehicle towards a perch on the ground station. Prior to landing on the perch, the aerial vehicle may transition from a flying mode to a hover mode. After the aerial vehicle transitions to hover mode, the tether may be wound onto the drum until the aerial vehicle comes to rest on the perch.

Airborne wind turbines may provide significant advantages over conventional wind turbines. For example, airborne wind turbines may fly at a distance of 500 meters above the ground where the wind is significantly stronger than closer to the ground (e.g. 70 meters) where conventional wind turbines are positioned. The wind at 500 meters may provide twice the power as wind at 70 meters. In addition, conventional wind turbines typically require huge blades and large towers to support the blades. Manufacturing, transporting, and maintaining the blades and towers are very costly, compared to an airborne wind turbine.

Furthermore, conventional wind turbines typically require a gearbox to increase the rotations per minute ("rpm") of the spinning turbine blades to a rate that is useful for a generator. Gearboxes can be expensive and prone to failure. In an example AWT, the aerial vehicle may fly at 100-150 miles per hour, with the much smaller propellers spinning at a rate of 1000 rpm, so that a gearbox is not required. Moreover, because a large tower and inner portion of large turbine blades are not required, the material costs of an airborne wind turbine is less than the cost of a conventional wind turbine by a factor of 10.

However, airborne wind turbines may provide another significant advantage over conventional wind turbine when it comes to offshore power generation. In particular, strong, consistent winds may be found in deep offshore locations (e.g., in water that is 30 meters deep or deeper). However, because of the large gyroscopic loads caused by its spinning blades, the top of a conventional wind turbine may not be able to tolerate the sway which can result due to wind, current and waves. If a floating platform is used to support a conventional wind turbine, this may require a tremendous amount of ballast to prevent the top of the wind turbine from swaying due to wave action, currents, and/or wind. Therefore, a floating platform for a conventional platform may not be practical.

Accordingly, for offshore applications, conventional wind turbines typically have towers extending from above the ocean surface down to the seabed. Thus, the deeper the water the greater the size of the tower, and the greater the moment about the base of the tower caused by the spinning turbine blades. Therefore, the use of conventional wind turbines for deep water applications may not be viable. In particular, the cost of building and/or installing such towers may be prohibitively expensive in many offshore locations.

Example embodiments are directed to a spar buoy platform, which may be anchored to the seabed, and which may be used in an airborne wind turbine system in offshore locations. With an airborne wind turbine system, the aerial vehicle is attached by a tether that extends to the top of the buoy platform near the water level so there is no large moment caused by the flying aerial vehicle, unlike the moment about the base of the tower caused by the spinning blades on the top of a tower in conventional wind turbines. Moreover, the moment remains the same regardless of the depth of the water because the tether extends to the platform just above sea level, rather than to the seabed. This is particularly advantageous in deep offshore applications.

Furthermore, the spar buoy does not have to be a huge buoy like one required for a conventional wind turbine, because when the aerial vehicle is in flight the airborne wind turbine system is insensitive to sway at the top of the buoy caused by wave action or wind. In other words, during crosswind flight, it may not matter if the top of the buoy sways above the surface of the water. However, the top of the buoy platform should be stable during landing of the aerial vehicle.

A ballast or mass may be provided at the bottom of the spar buoy to help maintain the buoy in an upright position to provide stability. The mass may be water, fill, steel, or concrete positioned in the bottom of the buoy to provide stability. The spar buoy should be stable enough to stay upright during launching and landing of the aerial vehicle.

The spar buoy may be attached to moorings anchored to the seabed through a line that may be advantageously attached to an offset arm extending from the spar buoy. With this arrangement when the aerial vehicle is flying in crosswind flight the aerial vehicle is pulling the top of the spar buoy towards the aerial vehicle such that the spar buoy is biased to tip towards the aerial vehicle. Furthermore, with the offset arm, the pulling force of the aerial vehicle provides for a more straight tension load extending through the tether, offset arm and line to the moorings. Thus, the moment caused by the pulling of the aerial vehicle may be reduced, and the spar buoy does not undergo the large bending moments at the base of the tower found in conventional wind turbines.

The ability to tip is also an advantage because the aerial vehicle flies in loops, where the aerial vehicle is climbing for part of the loop, and going down for part of the loop. So by having a system where you are actually lifting and lowering the entire spar buoy, energy is being stored. Therefore, because the spar buoy can tip and is more compliant than a land based design, potential energy can be stored that helps even out the energy that the aerial vehicle is putting out. Therefore, the motors on the aerial vehicle are working at a more consistent level.

Furthermore, when the aerial vehicle is in circular flight, the oscillation of the buoy may trail the movement of the vehicle, such that there is a time when the vehicle is on the upstroke and the buoy is moving down, and vice versa on the downstroke. This relative movement may dampen the movement of the aerial vehicle, as well as the oscillation of the buoy. The net result may be to cause energy generation to be more stable as typically there is oscillation (more power generation on upstroke, less on downstroke). Advantageously, the aerial vehicle can be built to have a period of flight loop that falls within the same structural dead band of the structure as the 50 or 100 year wave period, which also must be avoided in terms of structural excitation. For example, the period of the 50 year wave might be 17 seconds, and the period of loop flown by the AWT might be between 10 and 20 seconds depending on wind speeds, and the spar buoy might be built to have its most significant resonance in terms of response to tension or wave action on a 35 second period.

In addition, the spar buoy provides for a small cross-section at the water line (and below) to minimize the transfer of wave energy and thus the effect of wave action on the spar buoy. Another consideration is that it may be desirable to position the buoy where the current and wave forces are in a different direction than the wind force.

The spar buoy platform has a natural resonance based on its mass and waterline diameter, such that it will bob up and down in the water at a certain frequency while the wind could be blowing at a different frequency. Therefore the spar buoy system should be relatively well damped so that it does not strongly resonate either with wave motion or with the motion of the aerial vehicle. Beneficially, the resonant frequencies can be set outside of those frequencies introduced by wave motion or by the aerial vehicle's flight and variation in tension and direction of force. A heave plate may be positioned horizontally about the spar buoy to provide damping. The diameter of the structure at waterline can be modified to achieve a beneficial response of the system. Beneficially, the heave plate may be configured so as to damp heave motions in the platform, but be placed horizontally so as to limit damping of pitch motions of the platform which might help store energy with only a partial loss to damping, as the aerial vehicle flies loops.

A drum may be used to store the tether as it reeled in towards the platform during a landing procedure. In an example, the drum may rotate about horizontal axis. As the tether is wound onto the drum the buoy may be tipped towards the aerial vehicle such that the tether is at an angle perpendicular to the drum. The spar buoy platform may include a perch that extends from the top of the spar buoy using perch supports. In some embodiments, the perch and perch supports may rotate about the top of the spar buoy to allow for a desired positioning of the perch during landing and launch. However, the present spar buoy design may advantageously allow for a non-rotating perch. In particular, the spar buoy may float in manner so that the spar buoy follows the wind. As the aerial vehicle is reeled in, the perch could be positioned in the path of the tether being wound onto the drum and the spar buoy and perch could simply float around and follow the aerial vehicle as it is reeled in. In this manner, the perch would always remain in a proper position for landing of the aerial vehicle.

In this manner, by rotating and following the aerial vehicle, the spar buoy platform may remove a yaw axis, which may allow motion of the spar buoy platform tower about its mooring to stabilize motion of the perch along its yaw axis, such as motion in azimuth.

2. ILLUSTRATIVE OFFSHORE AIRBORNE WIND TURBINES

Figure 2:
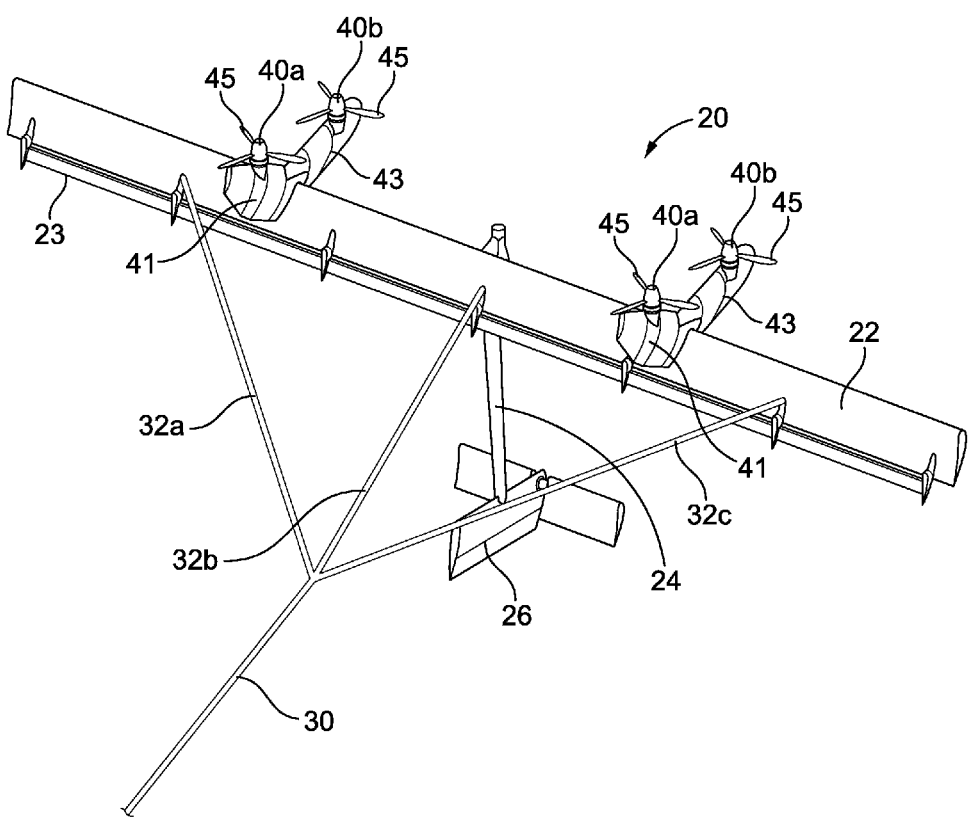
FIG. 2 is a close-up perspective view of aerial vehicle 20 shown in FIG. 1.

As disclosed in FIGS. 1-2, an offshore airborne wind turbine system 10 is disclosed, according to an example embodiment. The offshore airborne wind turbine system 10 is a wind based energy generation device that includes an aerial vehicle 20 constructed of a rigid wing 22 with mounted turbines 40*a*, 40*b* that flies in a path, such as a substantially circular path, across the wind. In an example embodiment, the aerial vehicle 20 may fly between 250 and 600 meters above the water to convert kinetic wind energy to electrical energy. However, an aerial vehicle may fly at other heights without departing from the scope of the invention. In the cross wind flight, the aerial vehicle 20 flies across the wind in a circular pattern similar to the tip of a wind turbine. The rotors 40*a* and 40*b* attached to the rigid wing 22 are used to generate power by slowing the wing 22 down. Air moving across the turbine blades forces them to rotate, driving a generator to produce electricity. The aerial vehicle 20 is connected to a spar buoy platform 50 via an electrically conductive tether 30 that transmits power generated by the aerial vehicle 20 to the spar buoy platform 50, and on to the grid.

As shown in FIG. 1, the aerial vehicle 20 may be connected to the tether 30, and the tether 30 may be connected to the spar buoy platform 50. In this example, the tether 30 may be attached to the spar buoy platform 50 at one location on the spar buoy platform 50, and attached to the aerial vehicle 20 at three locations on the aerial vehicle 20 using bridle 32*a*, 32*b*, and 32*c*. However, in other examples, the tether 30 may be attached at multiple locations to any part of the spar buoy platform 50 and/or the aerial vehicle 20.

The spar buoy platform 50 may be used to hold and/or support the aerial vehicle 20 until it is in an operational mode. The spar buoy platform 50 may include a vertically oriented main member 52 that may extend above the water on the order of 15 meters. The spar buoy platform 50 may also include a drum 53 rotatable about drum axis 55 that is used to reel in aerial vehicle 20 by winding the tether 30 onto the rotatable drum 53. In this example, the drum 53 is oriented horizontally, although the drum may also be oriented vertically (or at an angle). Further, the spar buoy platform 50 may be further configured to receive the aerial vehicle 20 during a landing. For example, perch support members 56*a* and 56*b* are attached to perch panel 54 and extend outwardly from rotatable drum 53. When the tether 30 is wound onto drum 53 and the aerial vehicle 20 is reeled in towards the spar buoy platform 50, the aerial vehicle 20 may come to rest upon perch panel 54. The spar buoy platform 50 may be formed of any material that can suitably keep the aerial vehicle 20 attached to the spar buoy while in hover flight, forward flight, or crosswind flight.

The tether 30 may transmit electrical energy generated by the aerial vehicle 20 to the spar buoy platform 50, which may then be transferred via cable to shore and onto the grid. In addition, the tether 30 may transmit electricity to the aerial vehicle 20 in order to power the aerial vehicle 20 during takeoff, landing, hover flight, and/or forward flight. The tether 30 may be constructed in any form and using any material which may allow for the transmission, delivery, and/or harnessing of electrical energy generated by the aerial vehicle 20 and/or transmission of electricity to the aerial vehicle 20. The tether 30 may also be configured to withstand one or more forces of the aerial vehicle 20 when the aerial vehicle 20 is in an operational mode. For example, the tether 30 may include a core configured to withstand one or more forces of the aerial vehicle 20 when the aerial vehicle 20 is in hover flight, forward flight, and/or crosswind flight. The core may be constructed of any high strength fibers or a carbon fiber rod. In some examples, the tether 30 may have a fixed length and/or a variable length. For example, in one example, the tether has a fixed length of 500 meters.

The aerial vehicle 20 may include or take the form of various types of devices, such as a kite, a helicopter, a wing and/or an airplane, among other possibilities. The aerial vehicle 20 may be formed of solid structures of metal, plastic and/or other polymers. The aerial vehicle 20 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

As shown in FIG. 1, and in greater detail in FIG. 2, the aerial vehicle 20 may include a main wing 22, rotors 40a and 40b, tail boom or fuselage 24, and tail wing 26. Any of these components may be shaped in any form which allows for the use of components of lift to resist gravity and/or move the aerial vehicle 20 forward.

The main wing 22 may provide a primary lift for the aerial vehicle 20. The main wing 22 may be one or more rigid or flexible airfoils, and may include various control surfaces, such as winglets, flaps, rudders, elevators, etc. The control surfaces may be used to stabilize the aerial vehicle 20 and/or reduce drag on the aerial vehicle 20 during hover flight, forward flight, and/or crosswind flight. The main wing 22 may be any suitable material for the aerial vehicle 20 to engage in hover flight, forward flight, and/or crosswind flight. For example, the main wing 20 may include carbon fiber and/or e-glass.

Rotor connectors 43 may be used to connect the upper rotors 40a to the main wing 22, and rotor connectors 41 may be used to connect the lower rotors 40b to the main wing 22. In some examples, the rotor connectors 43 and 41 may take the form of or be similar in form to one or more pylons. In this example, the rotor connectors 43 and 41 are arranged such that the upper rotors 40b are positioned above the wing 22 and the lower rotors 40a are positioned below the wing 22.

The rotors 40a and 40b may be configured to drive one or more generators for the purpose of generating electrical energy. In this example, the rotors 40a and 40b may each include one or more blades 45, such as three blades. The one or more rotor blades 45 may rotate via interactions with the wind and which could be used to drive the one or more generators. In addition, the rotors 40a and 40b may also be configured to provide a thrust to the aerial vehicle 20 during flight. With this arrangement, the rotors 40a and 40b may function as one or more propulsion units, such as a propeller. Although the rotors 40a and 40b are depicted as four rotors in this example, in other examples the aerial vehicle 20 may include any number of rotors, such as less than four rotors or more than four rotors, e.g. six or eight rotors.

Referring back to FIG. 1, when it is desired to land the aerial vehicle 20, the drum 53 is rotated to reel in the aerial vehicle 20 towards the perch panel 54 on the spar buoy platform 50, and the electrically conductive tether 30 is wound onto drum 53. Prior to landing on the perch panel 54, the aerial vehicle 20 transitions from a flying mode to a hover mode. The drum 53 is further rotated to further wind the tether 30 onto the drum 53 until the aerial vehicle 20 comes to rest on the perch panel 54.

3. ILLUSTRATIVE EXAMPLES OF A SPAR BUOY PLATFORM

Figure 3:
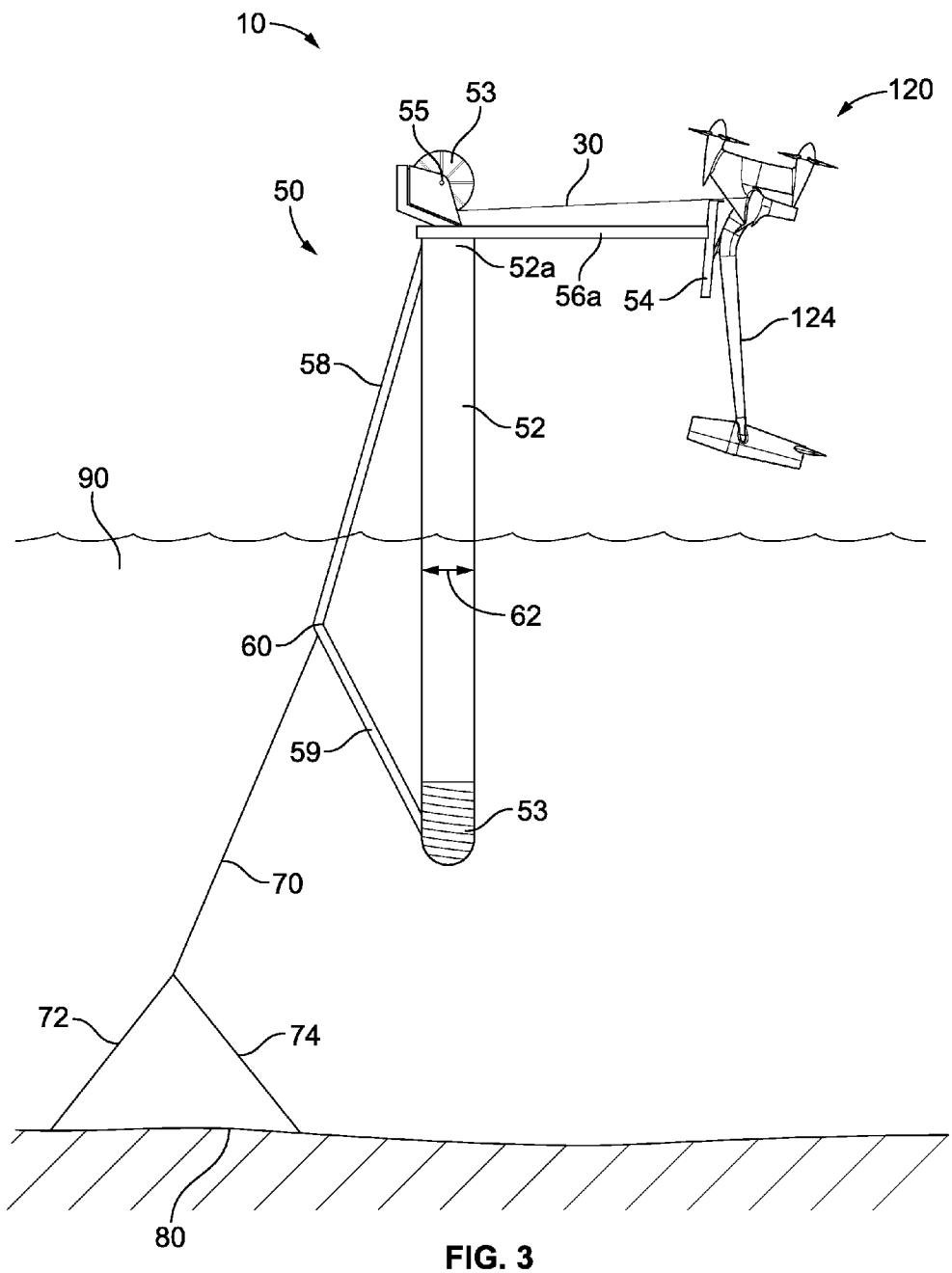
FIG. 3 is a side view of offshore airborne wind turbine 10 with an aerial vehicle 120 positioned on a perch 54, with an electrically conductive tether 30 attaching spar buoy platform 50 to aerial vehicle 120, according to an example embodiment.
Figure 4:
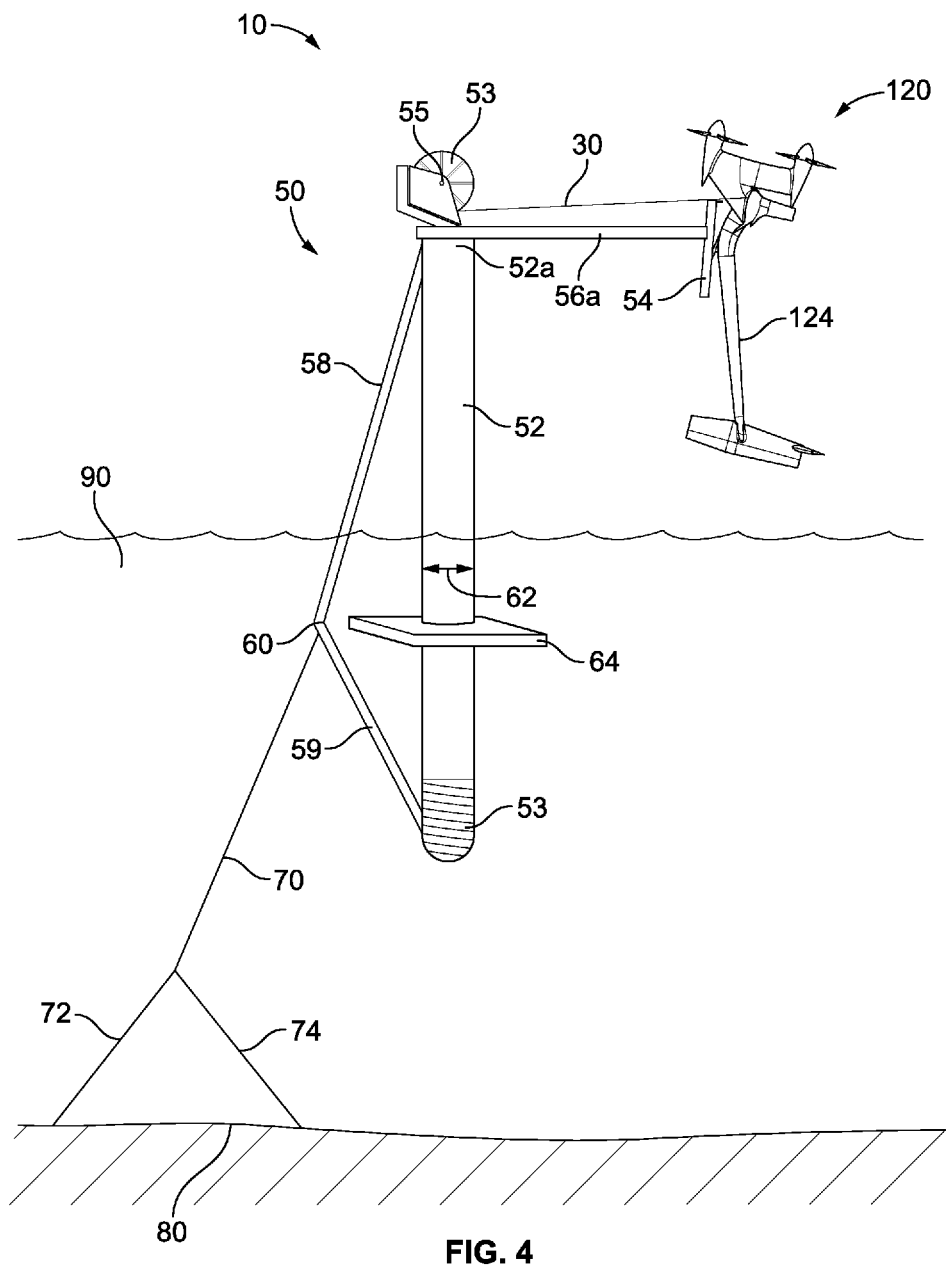
FIG. 4 is a side view of the offshore airborne wind turbine 10 shown in FIG. 3, with a heave plate 64 positioned on the main member 50 of the spar buoy, according to an example embodiment.

FIGS. 3 and 4 show an example embodiment of offshore airborne wind turbine 10 that includes aerial vehicle 120 having a fuselage 124. Aerial vehicle 120 is shown perched on perch panel 54 extending from perch support 56a attached to spar buoy platform 50. An electrically conductive tether 30 is shown extending from rotatable drum 53 that rotates about horizontal drum axis 55. The rotatable drum 53 is positioned atop upper end 52 of main member of spar buoy 52. Spar buoy platform 50 is stabilized by ballast 53 located at the bottom of the main member of spar buoy 52. An offset arm 58 extends from the top 52a of main member of spar buoy 52 where it extends to a connection point 60 positioned at the intersection of offset arm 58 and lower arm 59 that is connected to the bottom of main member of spar buoy. A first end of line 70 is attached to mooring lines 72 and 74 anchored to seabed 80 and a second end of line 70 is attached to connection point 60. The main member of spar buoy 52 has a small cross section 62 at the waterline (and below) that minimizes energy transfer from forces from waves or current of water 90 passing by main element 52.

A ballast or mass 53 may be provided at the bottom of the main element 52 of the spar buoy to help maintain the buoy in an upright position to provide stability. The mass may be water, fill, steel, or concrete positioned in the bottom of the buoy to provide stability. The spar buoy should be stable enough to stay upright during launching and landing of the aerial vehicle 20.

Figure 5:
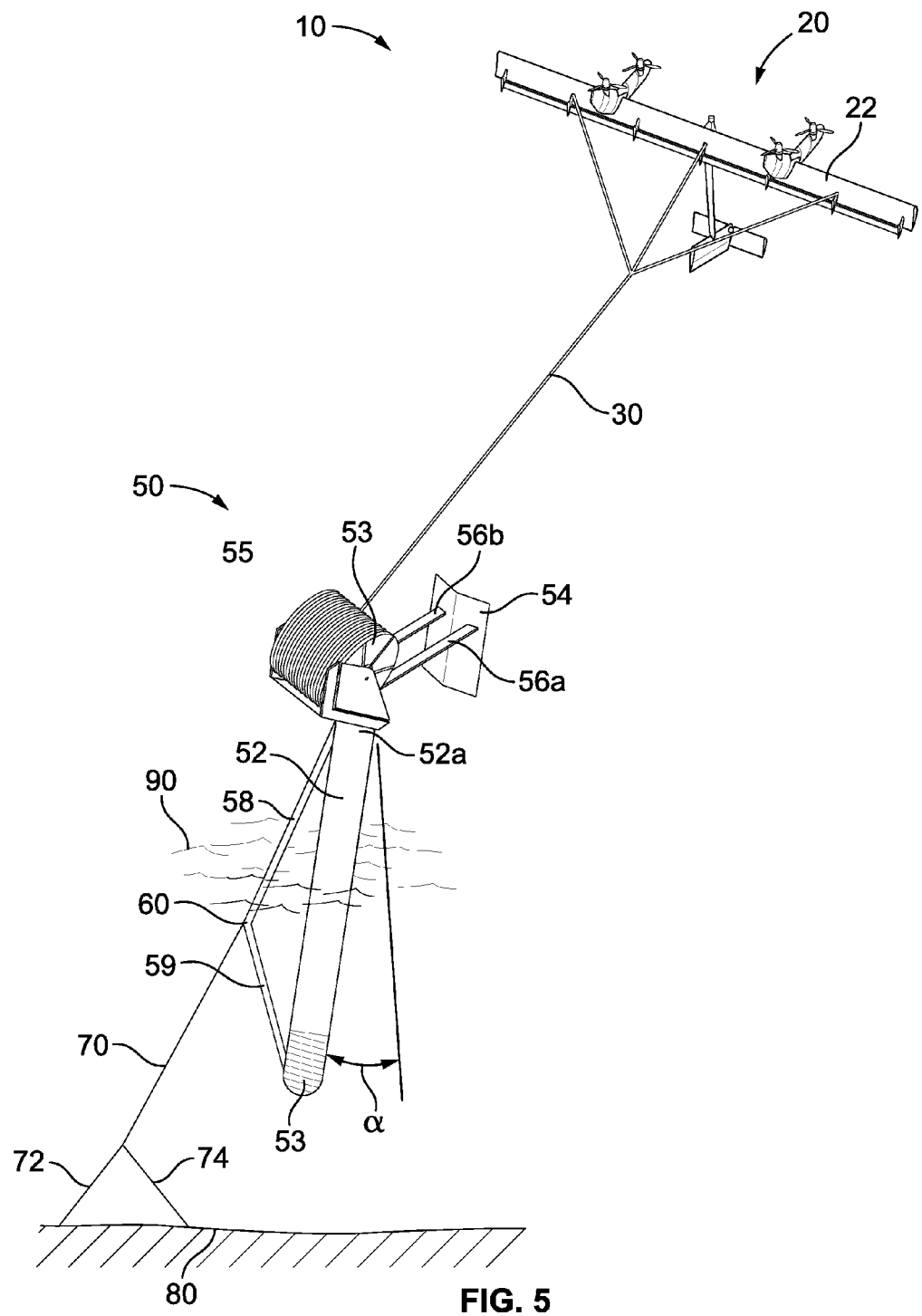
FIG. 5 is a perspective view of offshore airborne wind turbine 10 shown in FIG. 3 with the spar buoy platform 50 tipped towards aerial vehicle 120, according to an example embodiment.

FIG. 5 shows the offshore airborne wind turbine system 10 shown in FIGS. 1-4 shown with aerial vehicle 20 in an airborne state. In this example, the aerial vehicle 20 is attached by a tether 30 that extends to the top of the spar buoy platform 50 near the water level so there is no large moment caused by the flying aerial vehicle 20, unlike the moment about the base of the tower caused by the spinning blades on the top of a tower in conventional wind turbines. Moreover, the moment remains the same regardless of the depth of the water 90 because the tether 30 extends to the spar buoy platform 50 just above sea level, rather than to the seabed as is the case with conventional wind turbines. This is particularly advantageous in deep offshore applications.

In FIG. 5 the pulling force of aerial vehicle 20 as it flies and attached tether 30 exerts a force that tends to tip the spar buoy platform 50 at an angle α towards the aerial vehicle 20. The ability to tip is also an advantage because the aerial vehicle 20 flies in loops, where the aerial vehicle 20 is climbing for part of the loop, and going down for part of the loop. So by having a system where you are actually lifting and lowering the entire spar buoy platform 50, energy is being stored. Therefore, because the spar buoy platform 50 can tip and is more compliant than a land based design, potential energy can be stored that helps even out the energy that the aerial vehicle 20 is putting out. Therefore, the motors on the aerial vehicle 20 may work at a more consistent level. This beneficial aspect must be balanced against the desire to avoid a strong resonance of the platform that would increase loads, and there is an optimal or optimal range of system parameters to achieve some amount of power balance while avoiding undesired loads. For example, the frequency of the wing might be significantly beyond or sufficiently before the resonant modes of the platform on various axes of excitation or along certain eigenmodes. However, if the system is made to have a different response in flight, both beneficial aspects may potentially be preserved. For example, the greater waterline area of the buoy when tipped at flight angles and put at flight depth, or when the mooring lines are at flight tensions, may results in a significantly faster pitch response with lower damping than when the buoy is more upright and the system is parked.

The spar buoy platform 50 may be attached to mooring lines 72 and 74 that are anchored to the seabed through a line 70 that may be advantageously be attached to an offset arm extending 58 from the top 52a of main element 22 of spar buoy platform 50. With this arrangement when the aerial vehicle 20 is flying in crosswind flight the aerial vehicle 20 is pulling the top of the spar buoy platform 50 towards the aerial vehicle 20 such that the spar buoy platform 50 is biased to tip towards the aerial vehicle 20. Furthermore, with the offset arm 58, the pulling force of the aerial vehicle 20 provides for a more straight tension load extending through the tether 30, offset arm 58, and line 70 to the mooring lines 72 and 74. Thus, the moment caused by the pulling of the aerial vehicle 20 may be reduced, and the spar buoy platform 50 does not undergo the large bending moments at the base of the tower found in conventional wind turbines.

Furthermore, the spar buoy platform 50 does not have to be a huge buoy like one that would be required for a conventional wind turbine, because when the aerial vehicle 20 is in flight, the airborne wind turbine system 10 is insensitive to sway at the top of the buoy caused by wave action or wind. In other words, during crosswind flight, it doesn't matter if the top of the spar buoy platform 50 sways above the water, as long as the top of the spar buoy platform 50 is stable during landing of the aerial vehicle 20.

Referring back to FIG. 4, as noted above the spar buoy platform 50 may have a natural resonance based on its mass and waterline diameter, such that it will bob up and down in the water 90 at a certain frequency while the wind could be blowing at a different frequency. Therefore the spar buoy platform 50 should be relatively well damped so that it is past the critical frequency where the spar buoy mostly follows the movement of the aerial vehicle 20. To provide for damping of the spar buoy platform 50, a heave plate 64 may be positioned horizontally about the main element 52 of the spar buoy.

Figure 6A:
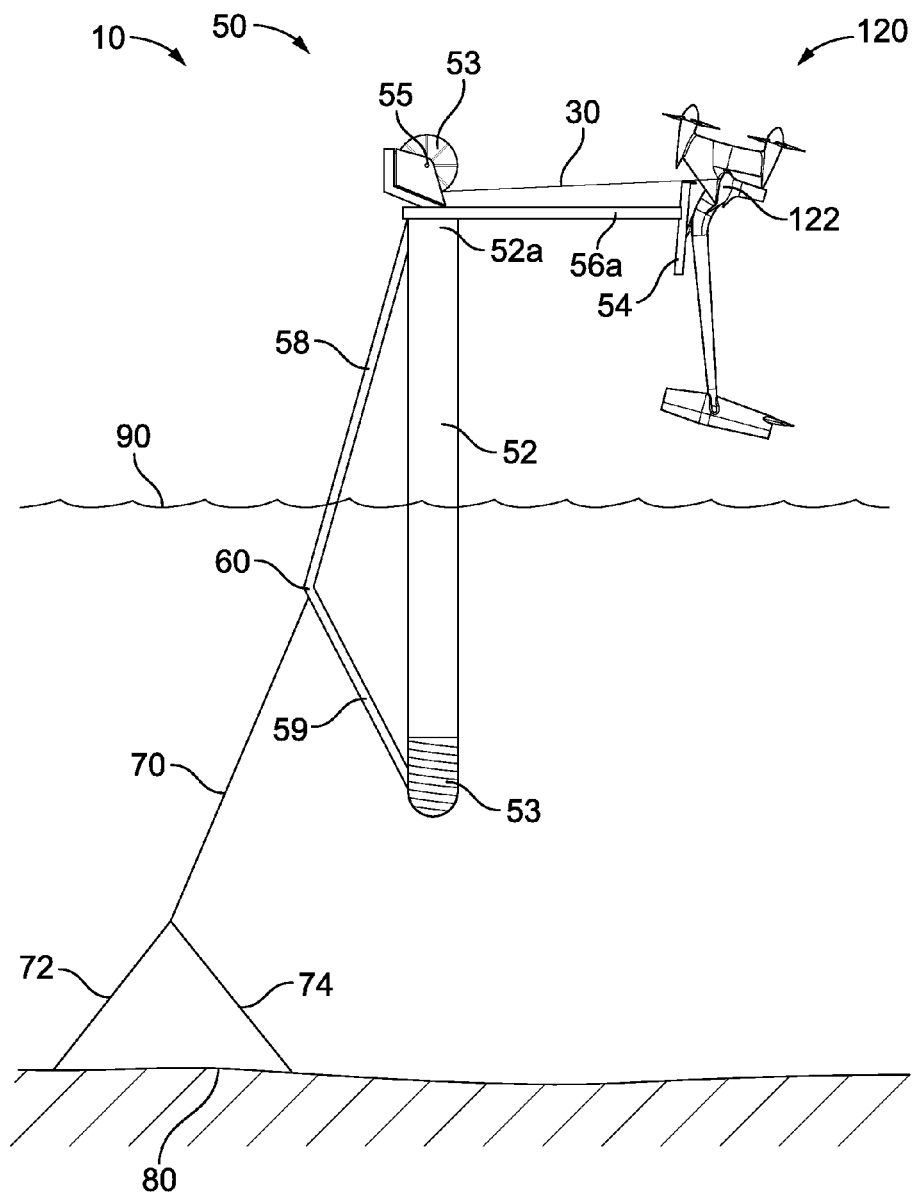
FIG. 6A is a side view of offshore airborne wind turbine 10 shown in FIG. 5, with the aerial vehicle 120 perched on perch 54 of spar buoy platform 50, according to an example embodiment.
Figure 6B:
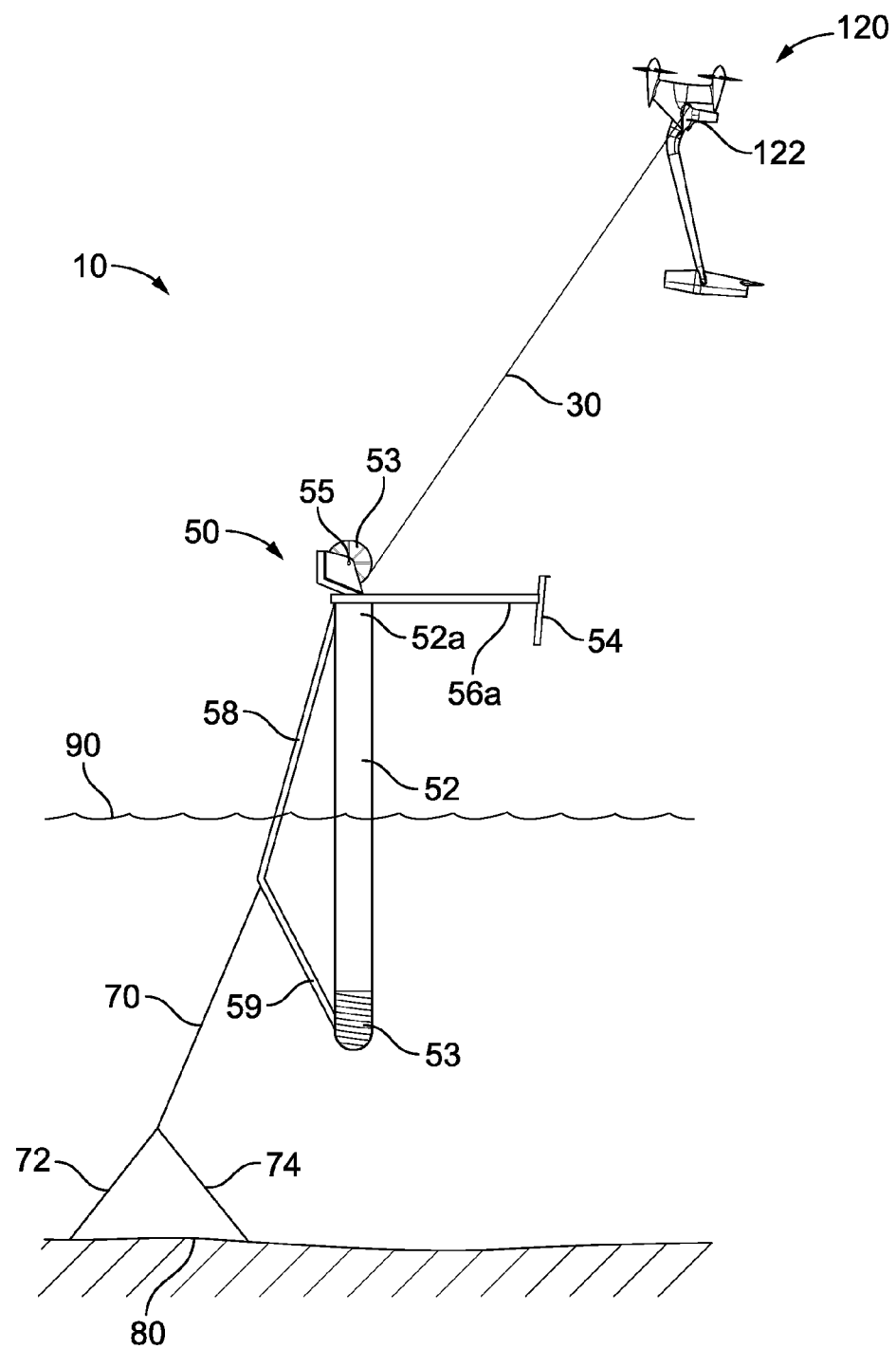
FIG. 6B is a side view of offshore airborne wind turbine 10 shown in FIG. 6A, with the aerial vehicle unreeling from rotatable drum 53 positioned on spar buoy platform 50, according to an example embodiment.
Figure 6C:
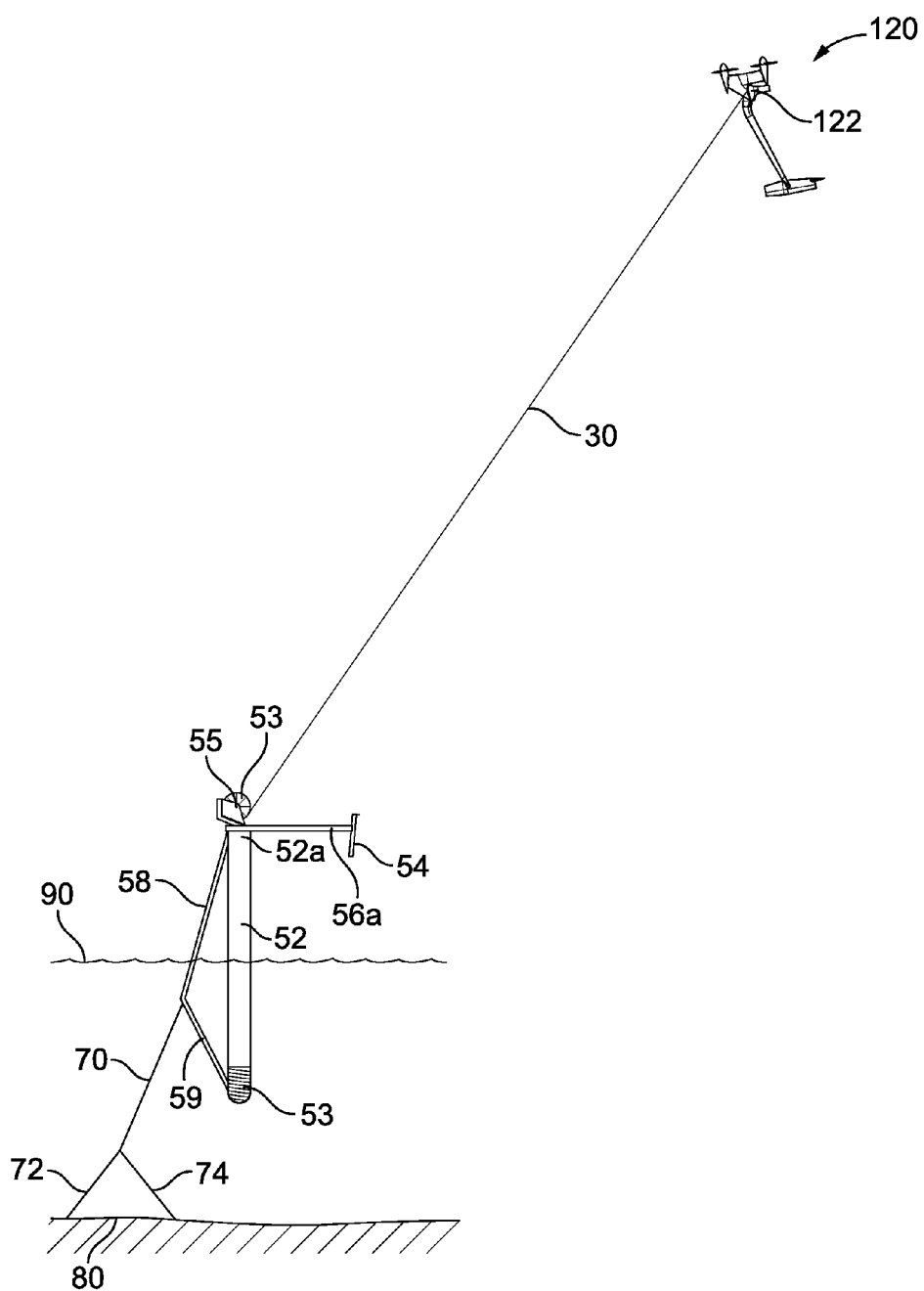
FIG. 6C is a side view of offshore airborne wind turbine 10 shown in FIGS. 6A and 6B, with the aerial vehicle 120 transitioning into crosswind flight, according to an example embodiment.

FIGS. 6A-6C illustrate a side view of offshore airborne wind turbine 10 shown in FIG. 5 with aerial vehicle 120 shown in different positions. FIG. 6A is a side view of offshore airborne wind turbine 10 with aerial vehicle 120 perched on perch panel 54 of spar buoy platform 50, according to an example embodiment. Aerial vehicle 120 is shown perched on perch panel 54 extending from perch support 56a attached to spar buoy platform 50. An electrically conductive tether 30 is shown extending from rotatable drum 53, that rotates about horizontal drum axis 55, to wing 122 of aerial vehicle 120. The rotatable drum 53 is positioned atop upper end 52a of main member of spar buoy 52. Spar buoy platform 50 is stabilized by ballast 53 located at the bottom of the main member of spar buoy 52. An offset arm 58 extends from the top 52a of main member 52 of the spar buoy where it extends to a connection point 60 positioned at the intersection of offset arm 58 and lower arm 59 that is connected to the bottom of main member 52 of spar buoy platform 50. A first end of line 70 is attached to mooring lines 72 and 74 that are anchored to seabed 80 and a second end of line 70 is attached to connection point 60. The main member of spar buoy 52 has a small cross section 62 at the waterline (and below) that minimizes energy transfer from waves of water 90 passing by main element 52.

FIG. 6B is a side view of offshore airborne wind turbine 10 shown in FIG. 6A, with the aerial vehicle 120 unreeling from rotatable drum 53 positioned on spar buoy platform 50. Rotatable drum 53 may be used to store the tether 30 as it is reeled in towards the spar buoy platform 50 during a landing procedure. In a preferred embodiment, the drum 53 may rotate about horizontal axis 55. As the tether 30 is wound onto the drum 53 the spar buoy platform 50 may be tipped towards the aerial vehicle 120 such that the tether 30 is at an angle perpendicular to the axis 55 of drum 53. The spar buoy platform 50 may include a perch panel 54 that extends from the top of the spar buoy 52a using perch supports 56a (and 56b).

FIG. 6C is a side view of offshore airborne wind turbine 10 shown in FIGS. 6A and 6B, with the aerial vehicle 120 transitioning into crosswind flight, according to an example embodiment.

Figure 7A:
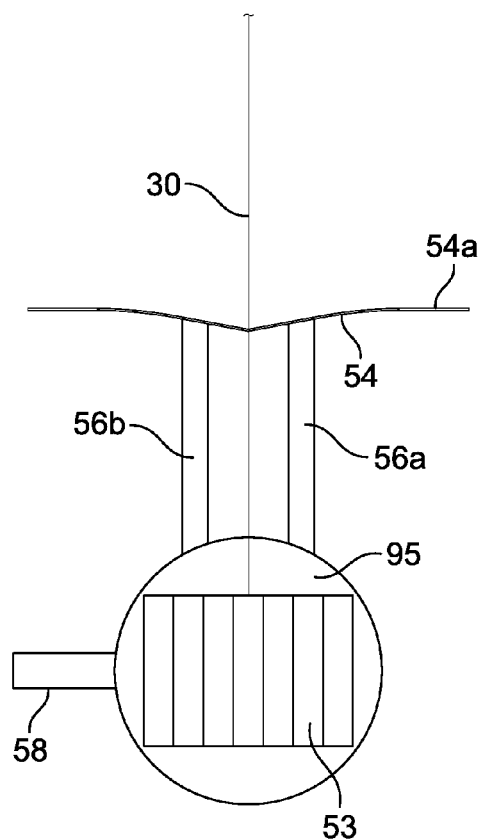
FIG. 7A is a top view of the spar buoy platform 50 shown in FIGS. 6A-6C with tether 30 extending from rotatable drum 53 with perch platform 95 in a first position relative to offset arm 58 of the spar buoy platform 50, according to an example embodiment.

FIG. 7A is a top view of the spar buoy platform 50 shown in FIGS. 6A-6C with tether 30 extending from rotatable drum 53 with perch platform 95 attached to perch supports 56a and 56b attached to perch panel 54 and perch bar 54a in a first position relative to offset arm 58 of the spar buoy platform 50, according to an example embodiment.

Figure 7B:
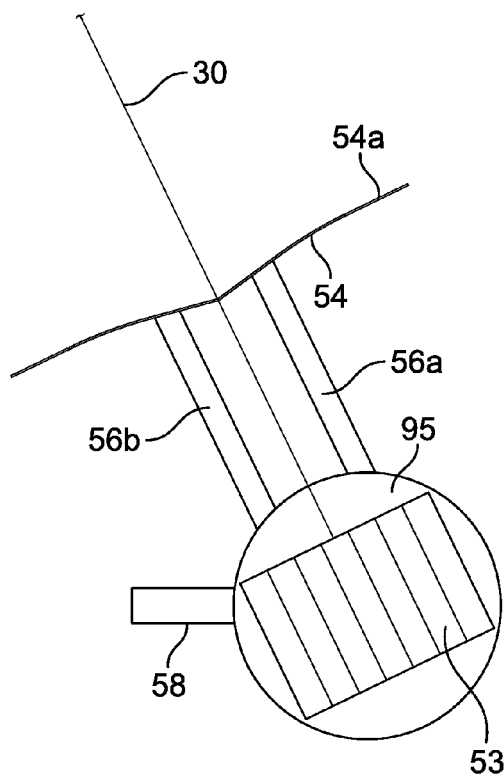
FIG. 7B is a top view of the spar buoy platform 50 shown in FIGS. 6A-6C with tether 30 extending from rotatable drum 53 with perch platform 95 in a second position relative to offset arm 58 of the spar buoy platform 50, according to an example embodiment.

FIG. 7B is a top view of the spar buoy platform 50 shown in FIGS. 6A-6C with tether 30 extending from rotatable drum 53 with perch platform 95 attached to perch supports 56a and 56b attached to perch panel 54 and perch bar 54a in a second position relative to offset arm 58 of the spar buoy platform 50, according to an example embodiment.

Figure 7C:
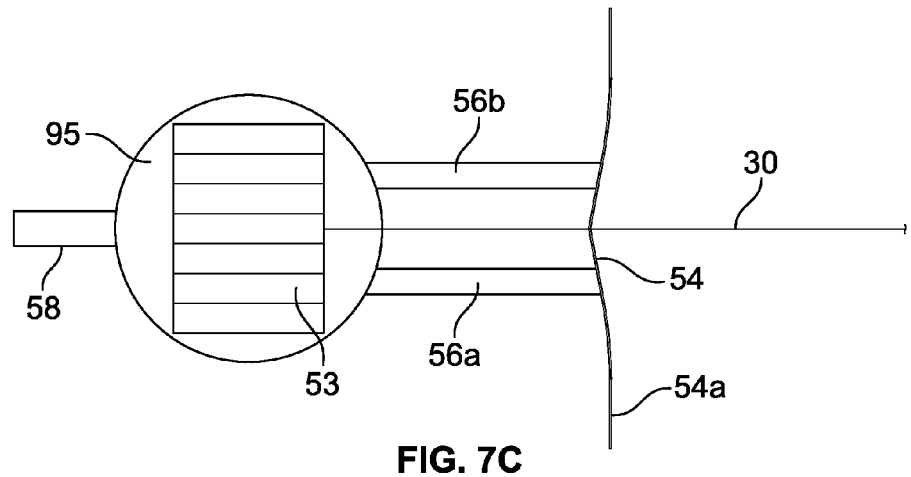
FIG. 7C is a top view of the spar buoy platform 50 shown in FIGS. 6A-6C with tether 30 extending from rotatable drum 53 with perch platform 95 in a third position relative to offset arm 58 of the spar buoy platform 50, according to an example embodiment.

FIG. 7C is a top view of the spar buoy platform 50 shown in FIGS. 6A-6C with tether 30 extending from rotatable drum 53 with perch platform 95 attached to perch support 56a and 56b attached to perch panel 54 and perch bar 54a in a third position relative to offset arm 58 of the spar buoy platform 50, according to an example embodiment.

In the embodiments shown in FIGS. 7A-7C, perch platform 95, perch supports 56a and 56b and perch panel 54 may rotate about the top 52a of main element 52 of the spar buoy platform 50 to allow for a desired positioning of the perch panel 54 during landing and launch.

However, the present spar buoy platform design may advantageously allow for a non-rotating perch panel 54. In particular, the spar buoy platform 50 may float in the water 90 in a manner so that the spar buoy platform 50 follows the wind. As the aerial vehicle 120 is reeled in, the perch panel 54 could be positioned in the path of the tether 30 being wound onto the drum 53 and the spar buoy platform 50 (as shown in FIG. 7A) and perch panel 54 could simply float around on top of spar buoy platform 50 and follow the aerial vehicle 120 as it is reeled in. In this manner, the perch panel 54 would always remain in a proper position for landing of the aerial vehicle, and the need for a rotatable perch platform could be eliminated.

Figure 8A:
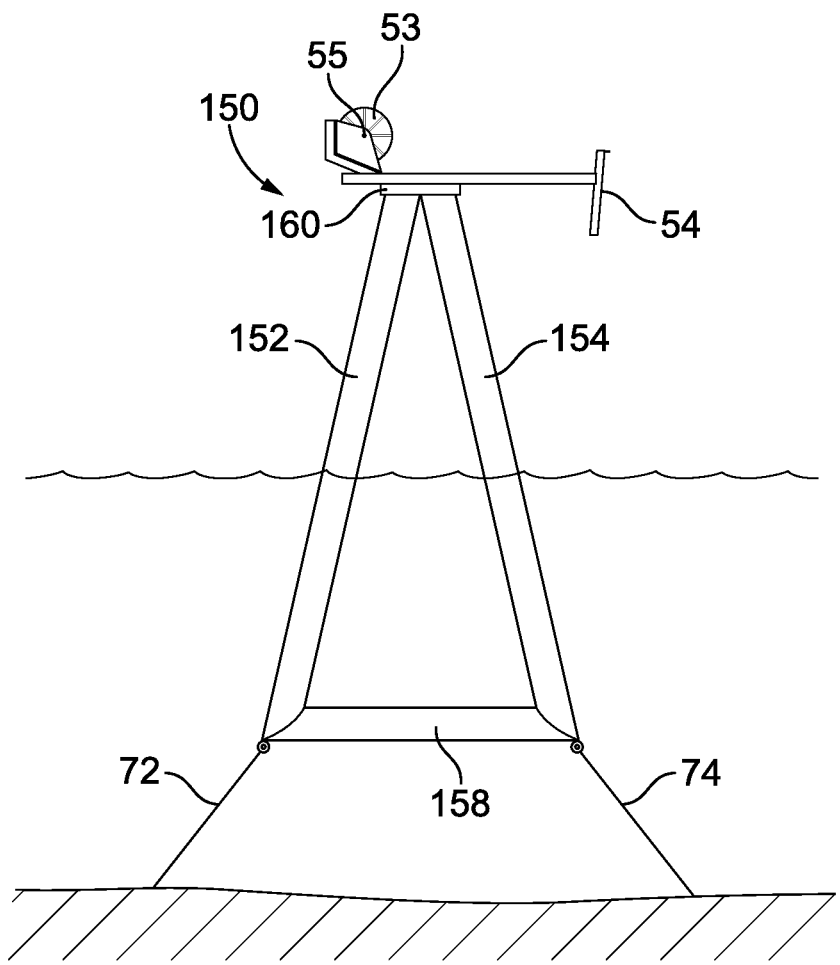
FIG. 8A is a side view of an alternate spar buoy platform 150 having drum 53 and perch panel 54 positioned on top, according to an example embodiment.
Figure 8B:
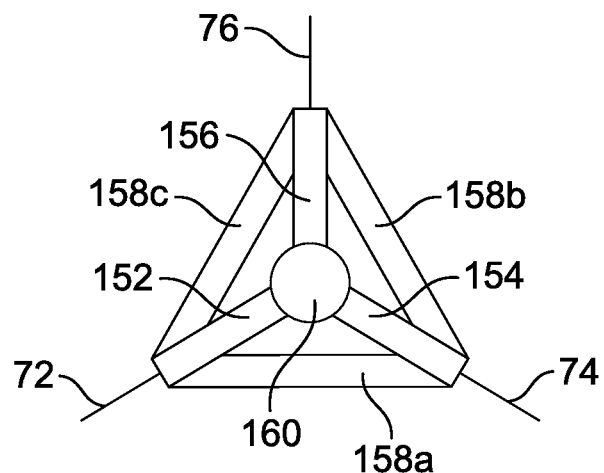
FIG. 8B is a top view of the spar buoy platform 150 shown in FIG. 8A.

FIGS. 8A and 8B are views of an alternate spar buoy platform 150 having a drum 53 rotatable about axis 55 and perch panel 54 positioned on top 160, according to an example embodiment. Downwardly extending legs 152, 154, and 156 extend beneath top 160 and are connected to cross members 158a, 158b, and 158c Mooring lines 72, 74, and 76 are used to position the spar buoy platform in a desired position with respect to the wind, water current, or wave action.

The spar buoy platforms shown in the FIGS. 1-8 may have a frequency of oscillation that is between 0.5 and 2 times a period of a loop flown by the aerial vehicle. In particular, the spar buoy platform may have a dead band between about 10 and 20 seconds. If the aerial vehicle also flies with a period of loop of 10-20 seconds (depending on wind), the platform is suited to both. Thus, in some embodiments, the platform may have a frequency of oscillation of 10-20 seconds and the period of the loop flown by the aerial vehicle is 10-20 seconds.

Figure 9A:
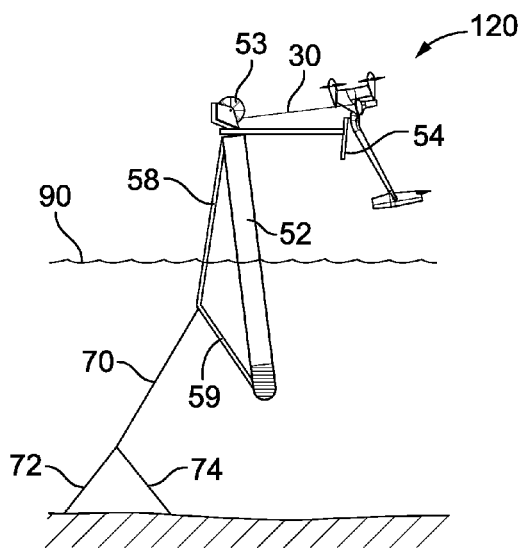
FIG. 9A is a side view of a spar buoy platform with aerial vehicle 120 in a perched position with main member 52 leaning to the left.
Figure 9B:
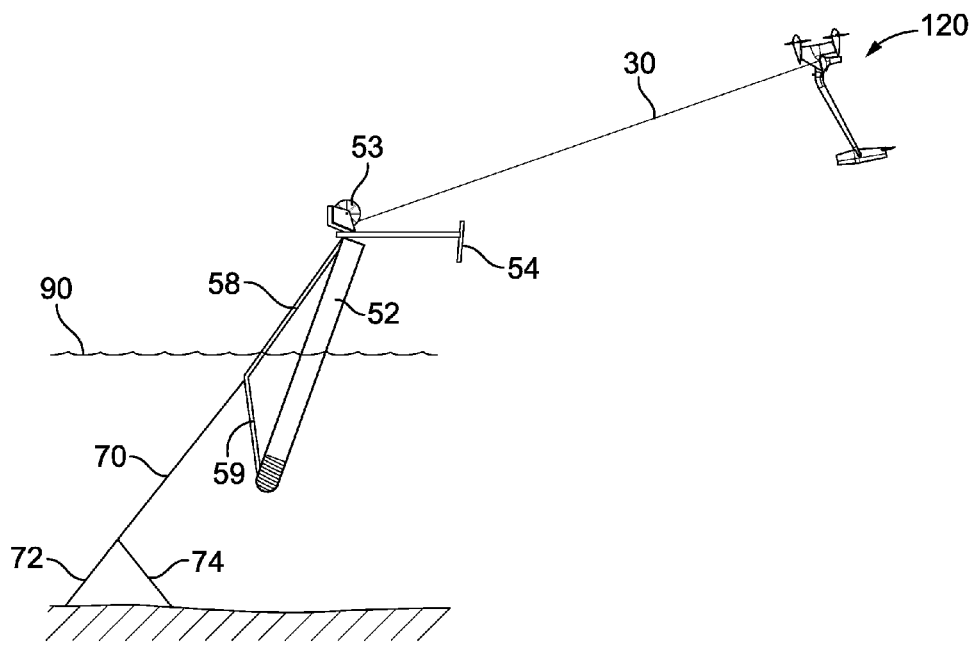
FIG. 9B is a side view of the spar buoy platform shown in FIG. 9A with the aerial vehicle 120 in flight and main member 52 leaning to the right towards the aerial vehicle 120.

FIG. 9A is a side view of a spar buoy platform with aerial vehicle 120 in a perched position. With aerial vehicle 120 perched on the spar buoy platform, the main member 52 is shown leaning to the left in a first orientation. FIG. 9B is a side view of the spar buoy platform shown in FIG. 9A with the aerial vehicle 120 in flight and main member 52 leaning to the right and angled away from vertical towards the aerial vehicle in a second orientation when the aerial vehicle is in the flying mode. Thus, the platform has a substantially different orientation when the aerial vehicle is perched than when the aerial vehicle is flying loops.

Furthermore, the spar buoy platform may be configured so that the position of the waterline in a first perched orientation is lower (or higher) than the position of the waterline in a second orientation when the aerial vehicle is in flight. A response from the spar buoy may change under flight loads to reduce damping and increase energy stored by the aerial vehicle through a change in a waterline level, a roll or pitch angle, or a change in a tether tension.

4. CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A spar buoy comprising:
   a vertically oriented main member, wherein the main member is configured to support an airborne wind turbine system platform positioned on an upper end of the main member;
   a ballast at a lower end of the main member;
   wherein a second end of an electrically conductive tether is attachable to the platform;
   wherein an aerial vehicle is attachable to a first end of the tether; and
   wherein an offset arm downwardly extends at an angle from an upper portion of the main member; and
   a pulling force of the aerial vehicle causes a tension load to extend axially through the offset arm and the mooring line, when a mooring line is attached to a lower end of the offset arm.

2. The spar buoy of claim 1, further comprising the airborne wind turbine system platform positioned on the upper end of the main member.

3. The spar buoy of claim 2, further comprising a rotatable drum positioned on the platform.

4. The spar buoy of claim 3, further comprising an aerial vehicle perch extending from the platform.

5. The spar buoy of claim 4, wherein the offset arm extends from a side of the main member of the spar buoy, and wherein, when the aerial vehicle is in a crosswind flight, the upper end of the spar buoy tips towards the aerial vehicle.

6. The spar buoy of claim 4, wherein the aerial vehicle perch is rotatable about a top of the spar buoy.

7. The spar buoy of claim 4, wherein the offset arm extends from a side of the main member of the spar buoy, and wherein when the aerial vehicle is being reeled in and the tether is being wound onto the rotatable drum, the aerial vehicle perch is positioned in a path of the tether being wound onto the rotatable drum.

8. The spar buoy of claim 7, wherein the rotatable drum has a horizontal axis of rotation.

9. The spar buoy of claim 1, wherein a lower arm is attached to a lower end of the offset arm, the lower arm also attached to a lower portion of the main member.

10. The spar buoy of claim 9, wherein the offset arm includes a connection point on a lower end of the offset arm for attachment to the mooring line.

11. The spar buoy of claim 10, wherein the connection point is positioned at an intersection between the lower end of the offset arm and the lower arm.

12. The spar buoy of claim 1, wherein a heave plate is positioned about the main member of the spar buoy.

13. A spar buoy comprising:
    a vertically oriented main member, wherein the main member is configured to support an airborne wind turbine system platform positioned on an upper end of the main member;
    a ballast at a lower end of the main member;
    wherein a second end of an electrically conductive tether is attachable to the platform;
    wherein an aerial vehicle is attachable to a first end of the tether;
    wherein an offset arm downwardly extends at an angle from an upper portion of the main member;
    wherein the offset arm extends from a side of the main member of the spar buoy, and wherein, when the aerial vehicle is in a crosswind flight, the upper end of the spar buoy tips towards the aerial vehicle; and
    wherein a pulling force of the aerial vehicle causes a tension load to extend axially through the offset arm and the mooring line when the mooring line is attached to the lower end of the offset arm.

14. The spar buoy of claim 13, wherein the mooring line is attached to the lower end of the offset arm.

15. The spar buoy of claim 13, wherein the mooring line is attached to an intersection of the lower end of the offset arm and a lower arm that is attached to the offset arm and to a lower portion of the main member.

16. A spar buoy comprising:
    a vertically oriented main member, wherein the main member is configured to support an airborne wind turbine system platform positioned on an upper end of the main member;
    a ballast at a lower end of the main member;
    wherein a second end of an electrically conductive tether is attachable to the platform;
    wherein an aerial vehicle is attachable to a first end of the tether; and
    wherein an offset arm downwardly extends at an angle from an upper portion of the main member; and
    wherein a mooring line is attached to a lower end of the offset arm.

17. The spar buoy of claim 16, wherein the mooring line is attached to an intersection of the lower end of the offset arm and a lower arm that is attached to the offset arm and to a lower portion of the main member.

* * * * *